United States Patent [19]

Berkeley

[11] Patent Number: 4,789,275
[45] Date of Patent: Dec. 6, 1988

[54] BORING STAND

[75] Inventor: James E. Berkeley, Cedar Rapids, Iowa

[73] Assignee: Kwik-Way Manufacturing Company, Marion, Iowa

[21] Appl. No.: 25,657

[22] Filed: Mar. 13, 1987

[51] Int. Cl.$^4$ .............................................. B23Q 5/34
[52] U.S. Cl. ........................................ 408/66; 408/69; 408/239; 408/709
[58] Field of Search ...................... 408/66, 69, 90, 91, 408/239, 709; 409/227, 230, 244; 254/343

[56] References Cited

U.S. PATENT DOCUMENTS

| | | | |
|---|---|---|---|
| 1,278,407 | 9/1918 | Werth | 408/90 |
| 1,339,409 | 5/1920 | Myers et al. | 408/709 X |
| 1,506,865 | 9/1924 | Robinson | 254/343 |
| 1,890,073 | 12/1932 | Boone | 408/91 X |

Primary Examiner—Eugene F. Desmond
Attorney, Agent, or Firm—Hill, Van Santen, Steadman & Simpson

[57] ABSTRACT

A boring stand for supporting engine blocks or cylinders which are to be bored that has a moveable platform which is slidably mounted on a vertical upright of a stand and has polyethylene wear plates engageable with a vertical upright. The moveable platform has a cable with one end which connects to an upper portion of the stand and a lower portion which passes around a reel within the platform structure which can be driven by a worm wheel and worm and which has a crank handle attached to the worm. The worm and worm wheel assures that the platform will stay in a preset position after adjustment and allows the platform to be positioned to any desired height.

6 Claims, 2 Drawing Sheets

BORING STAND

BACKGROUND OF THE INVENTION

1. Field of the Invention

This invention relates in general to boring stands and in particular to a novel boring stand with a moveable platform.

2. Description of the Prior Art

Boring stands of the prior art have provided a moveable platform for supporting the engine block or cylinders which is driven by a vertical threaded shaft with a hand wheel so as to move the platform to different vertical positions.

SUMMARY OF THE INVENTION

The present invention provides a novel moveable platform on a boring stand which has an upright which slidably receives the platform and in which polyethylene wear plates are provided so as to provide smooth and low friction connection between the platform and the vertical member and in which the cable has one end attached to an upper portion of the stand and a lower portion which passes around a reel which is connected to a worm wheel that is driven by a worm. A crank handle is attached to and drives the worm so as to adjust the position of the platform in the vertical direction.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
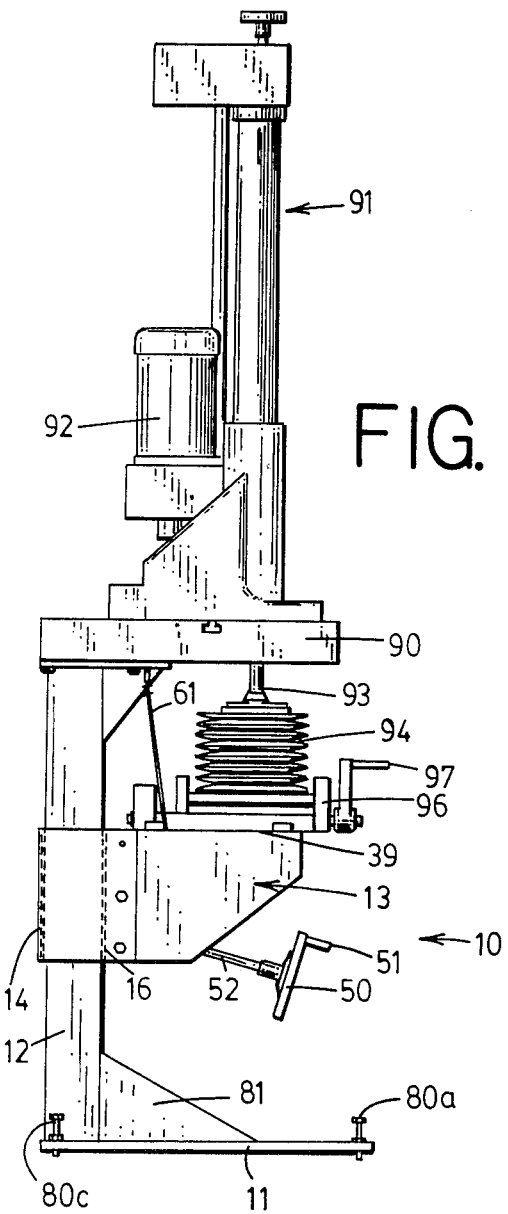
FIG. 1 is a side plan view of the boring stand with the boring bar and a cylinder mounted thereon.
Figure 2:
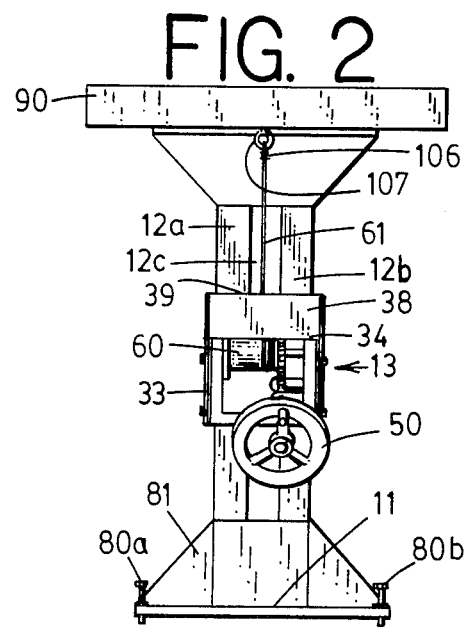
FIG. 2 is a front view of the boring stand of the invention.

The novel boring stand of the invention is illustrated in the Figures. FIG. 1, for example, is a side view which shows the boring stand 10 which comprises a base 11 with leveling screws 80a, 80b 80c illustrated. It is realized that a leveling screw would be mounted in each corner so as to level the machine. An upright guide member 12 is attached to the base 11 and is braced with a bracing member 81. The upright member 12 has outer portions 12a and 12b and a depression 12c in the center portion as illustrated in FIG. 2. The upper end of the upright member 12 carries a base plate 90 upon which a boring bar 91 is mounted which is driven by a motor 92 and has a boring tool shaft 93 which carries a boring tool for boring a cylinder 94 which is supported on a moveable platform 13 which is slidably mounted on the vertical upright 12. A cylinder support 96 is mounted on the upper surface 39 of the platform 13 and is adjustable by a crank arm 97 so as to move the cylinder into alignment with the boring shaft 93 which carries the boring tool.

Figure 5:
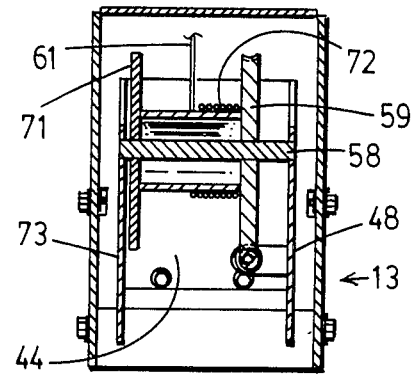
FIG. 5 is a sectional view through the reel supporting structure.
Figure 3:
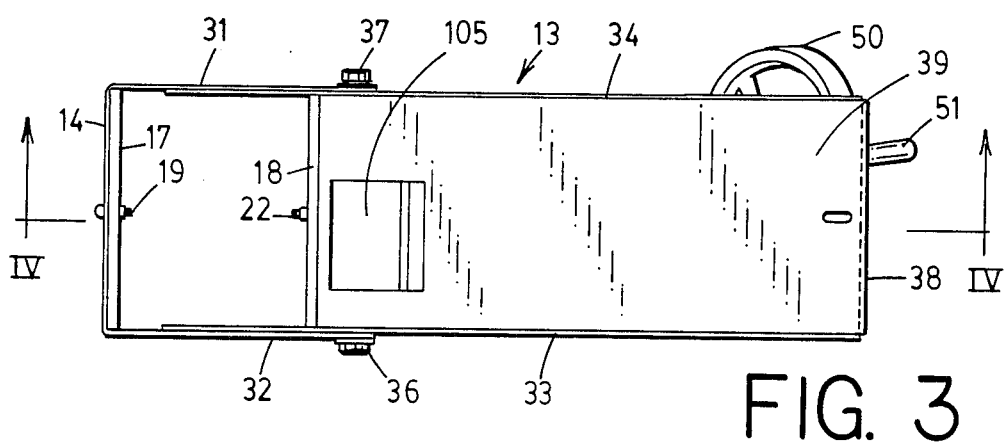
FIG. 3 is a top view of the boring stand.
Figure 4:
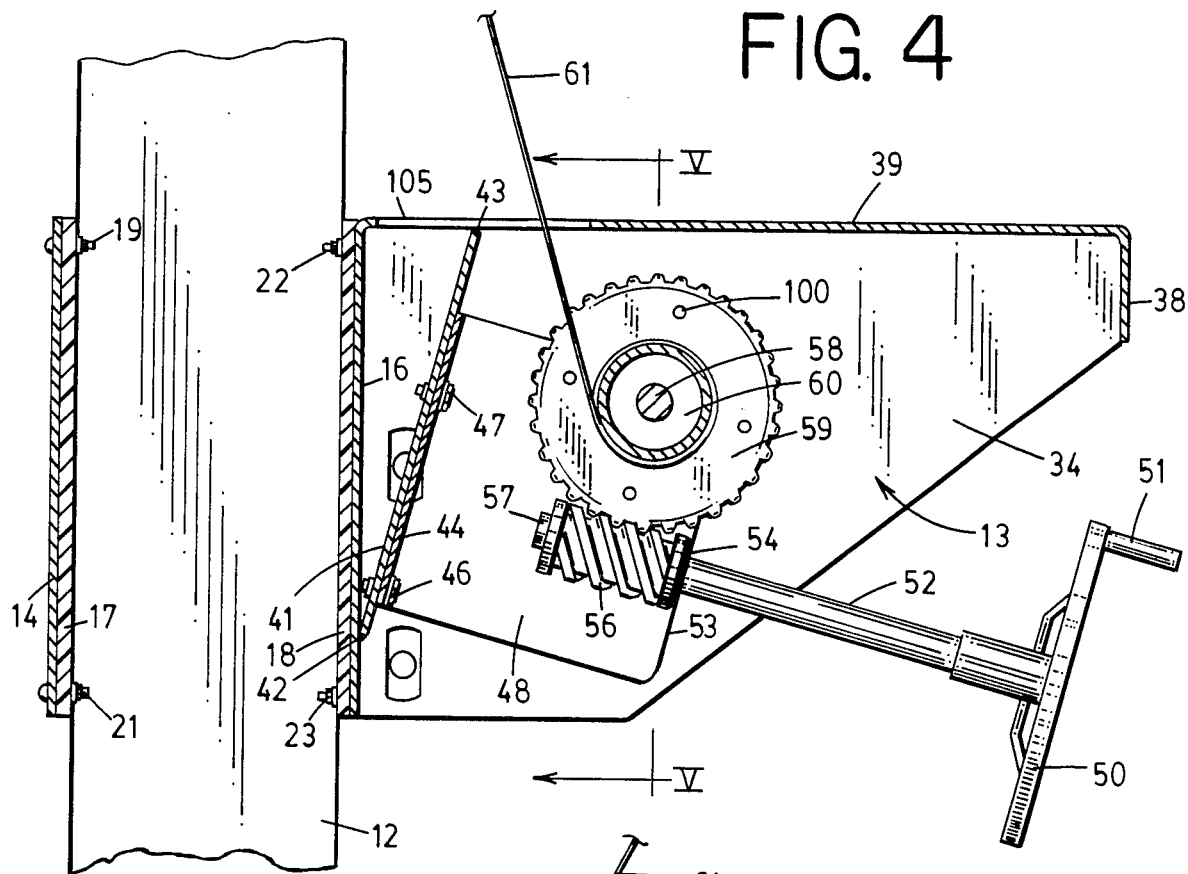
FIG. 4 is a sectional view taken on line IV—IV from FIG. 3.

As shown in FIGS. 3, 4 and 5, the moveable platform 13 has side members 33 and 34 which are attached by bolts 36 and 37 to extending plate members 31 and 32 which are connected by a back member 14 as illustrated, for example, in FIGS. 3 and 4. A first polyethylene wear plate 17 is attached by bolts and nuts to the member 14 and serves as a wear plate to engage the back surface of the member 12. A second polyethylene wear plate 18 is attached by bolt and nuts 22 to a downwardly extending member 16 which is connected to the upper plate 39 of the platform 13 as illustrated in FIG. 4. The bolts 19 and 22 move in depressions 12c and an associated depression formed in the rear of the vertical support 12 and do not engage the support 12. The top member 39 is formed with an opening 105 through which a cable 61 extends and which has an upper end 106 which is connected to an eye bolt 107 that is connected to the horizontal base plate 90 mounted on the top of the vertical support 12. The lower end of cable 61 passes around a reel 60 as shown in FIGS. 2, 4 and 5. The reel 60 is formed with a first flange 71 on one end thereof and a second end is formed as a worm wheel 59 which mates with a worm 56 supported by a bearing 54 and a plate 53 for rotation and which is attached to a shaft 52 which carries a hand wheel 50 that has a handle 51 as illustrated in FIG. 4, for example.

Figure 6:
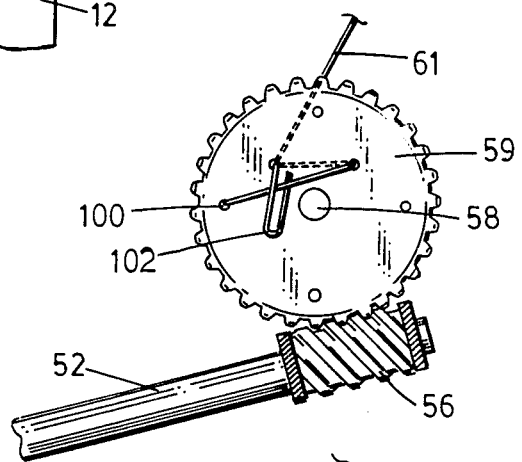
FIG. 6 illustrates one manner of mounting the cable to the reel.
Figure 7:
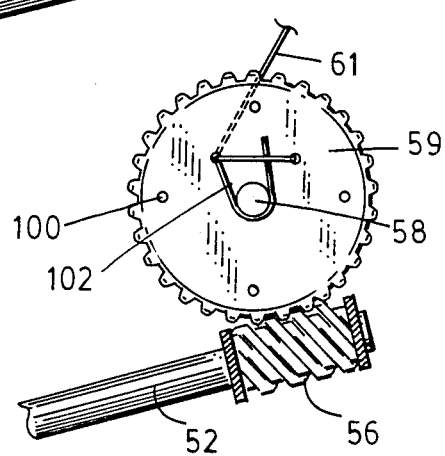
FIG. 7 illustrates an alternative method of mounting the cable to the reel.

The cable 61 is wound about the reel 60 to form a wound portion 72 as illustrated in FIG. 5 and has its end 102 connected to the worm wheel 59 as illustrated in FIGS. 6 and 7. FIG. 6 illustrates a first method of attaching the end of the cable 61 to the worm wheel 59 by passing it through openings 100. Five openings 100 are illustrated in the worm wheel 59 and FIG. 6 illustrates a first method of passing the end 102 of the cable through the openings so as to lock it and firmly attach it to the worm wheel 59. FIG. 7 illustrates a second method of firmly attaching the end of cable 61 to the worm wheel 59.

As shown in FIG. 5, the shaft 58 which supports the reel 60 is supported in side plate 48 and 73 which are attached by welding or otherwise to the frame of the platform 13.

In use, a cylinder 94 or engine block is mounted on the locking support member 96 of the moveable platform 13 and the vertical position of the platform 13 is adjusted to the desired position under the boring shaft 93 by moving the wheel 50. The wheel 50 rotates the shaft 52 which turns the worm 56 that rotates the worm wheel 59 thus turning the reel 60 which adjusts the length of the cable 61 to move the platform upward or downwardly as desired. The polyethylene wear plates 17 and 18 provide smooth movement and low friction between the vertical upright 12 and the guides in which the wear shoes 17 and 18 are mounted to provide smooth vertical adjustment of the platform 13.

When the desired vertical position of the platform 13 has been reached, rotation of the reel 50 is stopped and the boring machine 91 is actuated so as to bore the cylinder as illustrated in FIG. 1.

It is seen that the present invention provides a smooth running vertical platform which can be quickly and easily adjusted due to the worm and worm wheel and cable drive and the polyethylene wear plates 17 and 18.

Although the invention has been described with respect to preferred embodiments, it is not to be so limited as changes and modifications may be made therein which are within the full intended scope as defined by the appended claims.

I claim as my invention:

1. A boring stand comprising a base member, a vertical upright attached to said base member and an upper support plate attached to said vertical upright, a support platform moveably mounted on said vertical upright and formed with a guide opening through which said vertical upright extends, a reel rotatably supported by said support platform, and a cable with one end attached to said upper support plate and its lower end attached to said reel and means for rotating said reel so as to take up or pay out said cable to raise or lower said support platform, and wherein said vertical upright is rectangular in cross-section and said guide opening is rectangular in shape and at least one wear plate attached to said support platform within said guide opening for engaging a surface of said vertical upright.

2. A boring stand according to claim 4 wherein said means for rotating said reel comprises a worm wheel attached to said reel and a worm engageable with said worm wheel and rotatably mounted on said support platform.

3. A boring stand according to claim 2 wherein said means for rotating said reel further comprises a hand wheel attached to said worm.

4. A boring stand according to claim 1 wherein at least two wear plates are attached to said support platform with said guide opening for engaging two surfaces of said vertical upright.

5. A boring stand according to claim 1 wherein said wear plate is made of low friction material.

6. A boring stand according to claim 4 wherein said wear plate is made of polyethylene.

* * * * *